United States Patent [19]

Bauer

[11] 4,260,188

[45] Apr. 7, 1981

[54] HOOP ARRANGEMENT FOR FOLDABLE TOPS OF AUTOMOTIVE VEHICLES

[75] Inventor: Theodor Bauer, Altenriet, Fed. Rep. of Germany

[73] Assignee: Daimler-Benz Aktiengesellschaft, Stuttgart, Fed. Rep. of Germany

[21] Appl. No.: 47,080

[22] Filed: Jun. 11, 1979

[30] Foreign Application Priority Data

Jun. 10, 1978 [DE] Fed. Rep. of Germany ....... 2825526

[51] Int. Cl.³ ................................................. B60J 7/12
[52] U.S. Cl. .................................... 296/107; 296/116
[58] Field of Search ............... 296/107, 108, 111, 112, 296/113, 116

[56] References Cited

U.S. PATENT DOCUMENTS

| 2,682,427 | 6/1954 | Bright | 296/107 |
| 3,994,524 | 11/1976 | Lehmann | 296/107 |
| 2,864,388 | 12/1958 | Oliver | 296/111 |

Primary Examiner—John J. Love
Assistant Examiner—John A. Carroll
Attorney, Agent, or Firm—Craig and Antonelli

[57] ABSTRACT

A hoop arrangement for foldable tops of automotive vehicles which includes a bow-shaped main hoop connected to the top and a bow-shaped corner hoop provided at the top at a spacing from the main hoop for tightening the closed top at an outermost corner thereof. The corner hoop is pivotably supported with its two free ends each at a crank arm with the crank arm being arranged to be pivotable about the pivot point of the main hoop. The corner hoop is connected, at a spacing from its point of articulation to the crank arm, by way of a joint to a guide arm which hingedly engages at the main hoop at a spacing from its pivot point. The joint between the guide arm and the corner hoop cooperates, at least when the top is almost opened up, with a curved guide means which has an ascending slope in a direction pointing away from the pivot point of the main hoop.

5 Claims, 3 Drawing Figures

HOOP ARRANGEMENT FOR FOLDABLE TOPS OF AUTOMOTIVE VEHICLES

The present invention relates to a hoop arrangement and, more particularly, to a hoop arrangement for foldable tops of automotive vehicles, especially cross-country vehicles, wherein a bow-type main hoop connected to the foldable top is pivotably supported at the vehicle frame with another bow-shaped corner hoop being provided at the foldable top at a spacing from the main hoop for tightening the closed top at the outermost corner.

A number of foldable tops of the simplest type of construction have been proposed for cross-country vehicles. However, when such tops are folded back or down, a difficulty may arise that a corner hoop, during an opening of the top, comes to rest on, for example, a spare tire disposed at the rear of the vehicle since, in general, the spare tire projects above a top edge of the rear wall of the vehicle. In such a situation, additional cumbersome manipulations are normally required in order to place the corner hoop of the foldable top into a position in which it is flushed with a top edge of the rear wall of the vehicle. Moreover, the process of closing the top can become even more difficult if the corner hoop jams at the spare tire.

The aim underlying the present invention essentially resides in providing a hoop arrangement for foldable tops wherein a corner hoop of the top is guided over a spare tire of the vehicle during both a closing and opening of the foldable top.

In accordance with advantageous features of the present invention, the corner hoop is pivotably supported with its two free ends each at a crank arm with the crank arm being arranged so as to be pivotable about a pivot point of the main hoop and with a corner hoop connected, at a spacing from its point of articulation to the crank arm, by way of a joint to a guide arm which guide arm hingedly engages at the main hoop which is also at a spacing from its pivot point. A joint means between the guide arm and corner hoop cooperates, at least when the top is almost opened up, with a curved guide means which is fashioned to have an ascending slope as viewed in a direction away from the pivot point of the main hoop.

By virtue of the above-noted features of the present invention, the corner hoop, the more it is folded backwards, is, on the one hand, pulled in a forward direction by the action of the crank arm and, on the other hand, prevented by the curved guide means from contacting the top edge of the spare tire. Thus, a corner hoop is provided with a positive guide system of an extremely simple structure so that an impediment due to a jamming or incorrectly folded corner hoop cannot occur either during an opening or closing of the foldable top.

In accordance with the present invention, the curved guide means is constructed so that the corner hoop in a corner zone of the vehicle traverses a certain pivot range which is selected so that this certain pivot range extends in front of the vehicle spare tire thereby missing the tire. The joint means may suitably be provided with a runner or the like supported on a joint shaft with the runner rolling along the curved guide means.

Advantageously, acccording to the present invention, the guide means proper may be disposed at a base member wherein the pivot axle for the main hoop is disposed.

Accordingly, it is an object of the present invention to provide a hoop arrangement for a foldable top of a motor vehicle which avoids, by simple means, shortcomings and disadvantages encountered in the prior art.

Another object of the present invention resides in providing a hoop arrangement for foldable tops of a motor vehicle which may be opened and closed in a simple manner.

A further object of the present invention resides in providing a hoop arrangement for foldable tops of motor vehicles which ensures a positioning of the top flush with a top edge of the vehicle when the top is in a closed position.

A still further object of the present invention resides in providing a hoop arrangement for foldable tops of motor vehicles by which a jamming of the top is precluded during an opening and closing thereof.

Yet another object of the present invention resides in providing a hoop arrangement for foldable tops of a motor vehicle wherein of a motor vehicle which is simple in construction and therefore relatively inexpensive to manufacture.

These and other objects, features, and advantages of the present invention will become more apparent from the following description when taken in connection with the accompanying drawings which show, for the purposes of illustration only, one embodiment in accordance with the present invention, and wherein.

Figure 1:
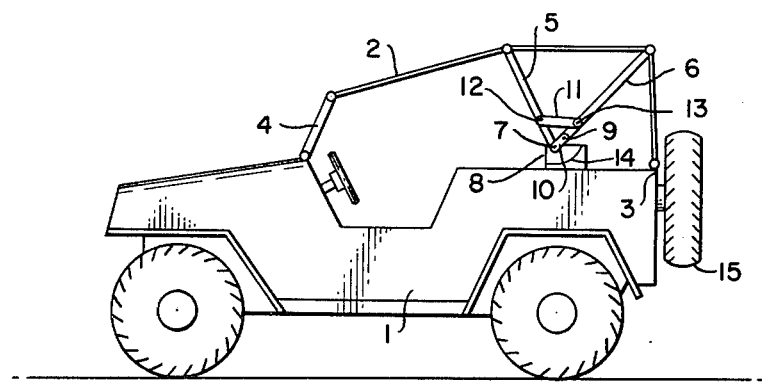
FIG. 1 is a partially schematic side view of a cross-country vehicle equipped with a closed foldable top held by a hoop arrangement in accordance with the present invention.

Referring now to the drawings wherein like reference numerals are used throughout the various views to designate like parts and, more particularly, to FIG. 1, according to this figure, a somewhat schematically illustrated cross-country vehicle 1 is provided with a foldable cloth top 2 or the like which can be attached, on the one hand, to the rear wall 3 of the vehicle, and on the other hand, to a top edge of a windshield 4. The foldable top 2 is tightened by a hoop arrangement which includes a main hoop 5 and a corner hoop 6 both of which span the width of the vehicle in a manner not illustrated in detail and both of which have the shape of a bow and are articulated to both sides of the vehicle so as to enable the top 2 and hoops 5, 6 to be folded back.

The main hoop 5 is pivotably supported at each side of the vehicle 1 about a pivot point 7. The pivot point 7 is located at a base member 8 threadedly attached to a side wall of the cross-country vehicle 1. Both free ends of the corner hoop 6 are respectively articulated by a pivot point 9 to a crank arm 10. The crank arm 10 is pivotably mounted about the pivot point 7 of the main hoop 5.

A guide arm 11 is provided at each side of the cross-country vehicle 1 for interconnecting the main hoop 5 to the corner hoop 6. One end of the guide arm 11 is connected to the main hoop 5 by a joint 12 with the other end of the guide arm 11 being connected to the corner hoop 6 by a joint generally designated by the reference numeral 13, the special function of which will be described more fully hereinbelow. A curved guide means 14 is arranged at the base member 8. The function of the guide means will also be described more fully hereinbelow.

A spare tire 15 is attached to the rear wall 3 of the cross-country vehicle 1 in a conventional manner with a top edge of the spare tire 15 projecting above or beyond a top edge of the rear wall 3 with the top edges of the side walls being aligned with the rear wall 3. To ensure that the corner hoop 6 will not come to rest on the top edge of the spare tire 15 during an opening of the foldable top 2 from the closed position of FIG. 1, a pivot bearing means for the main hoop and corner hoop is provided and shown in detail in FIGS. 2 and 3.

Figure 2:
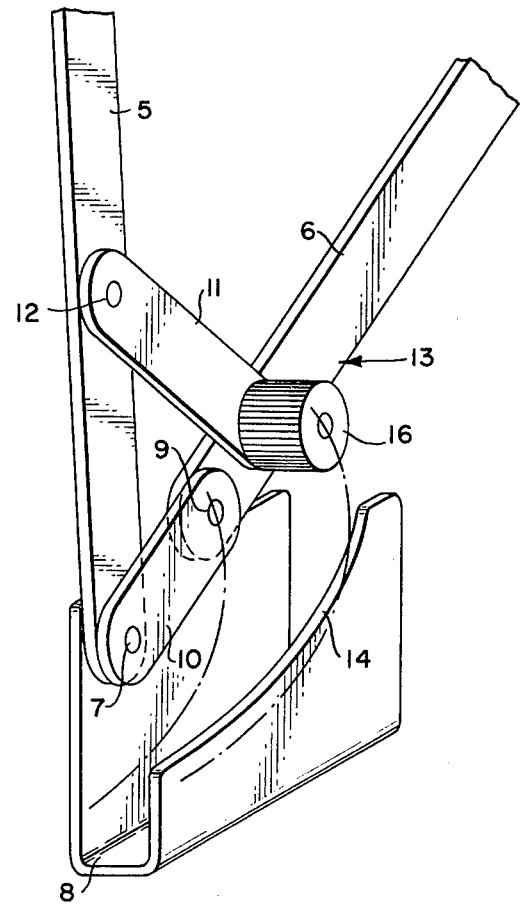
FIG. 2 is a perspective enlarged detail view of a bearing of a main and corner hoop provided at the vehicle, in the closed position of FIG. 1.

As shown most clearly in FIG. 2, the base member 8 is provided with a curved guide means 14 ascending, as viewed from the pivot axis or axle 7 of the main hoop 5, in a direction of the rear wall 3 of the cross-country vehicle 1. A runner 16 is provided on the same axle as the joint 13 with the runner 16 being engageable with the curved guide means. Therefore, once the top 2 is folded back from the position of the main and corner hoops 5, 6 shown in FIGS. 1 and 2, into a opened position, then the guide arm 11 presses the corner hoop 6 downwardly in the zone of the joint 13 due to a backward movement of the main hoop 5 so that the corner hoop 6 and crank arm 10 bend or pivot about the joint 9 and the retracting motion of the corner hoop 6 is initiated.

To prevent the corner hoop 6 from coming to rest on the top edge of the spare tire 15 before the corner hoop 6 has been pulled forward by the crank arm 10 to such an extent that it can no longer reach the spare tire, the curved guide means 14 is designed so that the runner 16 contacts a top zone of the curved guide means 14 before the bow-shaped section of the corner hoop 6 has reached the spare tire 15 so as to ensure a positive guidance of the corner hoop 6. During a further rearward movement of the main hoop 5 in the clockwise direction, the corner hoop 6 is initially pulled forward by the pivoting motion of the crank arm 10 before it can be further lowered in the downward direction. The curved guide means can be constructionally simple and the configuration of the curve can be empirically determined so as to ensure a displacement of the corner hoop which will preclude a jamming or engagement with a top edge of the spare tire.

Figure 3:
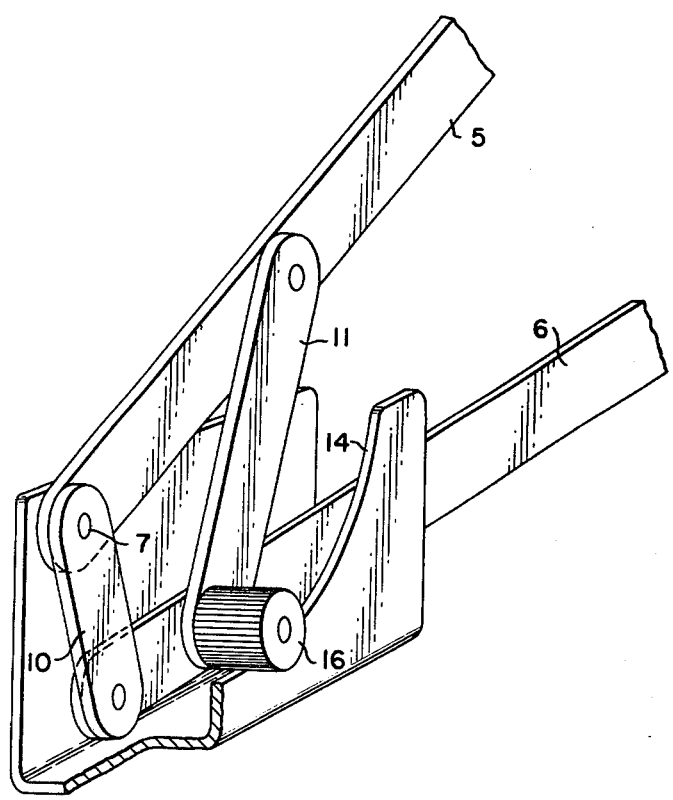
FIG. 3 is a perspective enlarged detail view similar to FIG. 2 but illustrating a position wherein the foldable top is folded back almost entirely.

As shown in FIG. 3, the curved guide means 14 passes over toward the front into a horizontal section so that the corner hoop 6 and main hoop 5 in the last portion of backward pivoting motion for an opening of the foldable top 2 are pivoted in parallel to each other. This pivoting motion takes place at a point in time when the corner hoop 6 has been retracted sufficiently forwardly by the pivoting motion of the crank arm 10 so that it can no longer contact the spare tire 15. The motion processes take place in the reverse order during a closing of the foldable top 2 and it is again ensured that the corner hoop 6 cannot jam at the spare tire 15. Thus, the hoop arrangement of the present invention provides a very simple system for a foldable top which enables the foldable top to be opened and closed without impediments.

While I have shown and described only one embodiment in accordance with the present invention, it is understood that the same is not limited thereto but is susceptible of numerous changes and modifications as known to one having ordinary skill in the art, and I therefore do not wish to be limited to the details shown and described herein, but intend to cover all such modifications as are encompassed by the scope of the appended claims.

I claim:

1. A hoop arrangement for a foldable top of a motor vehicle, the hoop arrangement comprising a bow-shaped main hoop connected to the foldable top, means for pivotably mounting the main hoop at respective sides of the vehicle, and a bow-shaped corner hoop means provided at the top and adapted to be spaced from the main hoop for tightening the foldable top at an outermost corner thereof when the top is in a closed position, the improvement comprising crank means for connecting respective free ends of the corner hoop means to the mounting means of the main hoop, said crank means being pivotably connected to the corner hoop means and the main hoop mounting means, guide arm means for connecting the main hoop to the corner hoop means, joint means disposed at a position spaced from the crank means for pivotably connecting a first end of the guide arm means to the corner hoop means, means for pivotably connecting a second end of the guide arm means to the main hoop at a position spaced from the main hoop mounting means, and guide means including a curved guide surface having an ascending slope in a direction pointing away from the main hoop mounting means and adapted to cooperate with said joint means at least when the foldable top is almost open for positively guiding a movement of the main hoop and corner hoop means during an opening and closing of the foldable top.

2. A hoop arrangement according to claim 1, wherein said curved guide surface is contoured so as to cause the corner hoop means to traverse a predetermined pivot range in a rear zone of the motor vehicle.

3. A hoop arrangement according to claim 2, on a vehicle having a spare tire mounted on a rear wall of the vehicle, wherein the predetermined pivot range passes forwardly of the spare tire.

4. A hoop arrangement according to one of claims 2 or 3, wherein the joint means includes a runner means engageable with the curved guide surface.

5. A hoop arrangement according to one of claims 1, 2, or 3, wherein the mounting means for the main hoop includes a base member mounted at respective sides of the vehicle, and wherein said guide means is arranged at said base member.

* * * * *